Feb. 16, 1943.  P. E. JAMES  2,311,549
REFRIGERATION APPARATUS
Filed April 3, 1942

WITNESSES:

INVENTOR
PAUL E. JAMES.
BY
ATTORNEY

Patented Feb. 16, 1943

2,311,549

UNITED STATES PATENT OFFICE 2,311,549

REFRIGERATION APPARATUS

Paul E. James, Mansfield, Ohio, assignor to Westinghouse Electric & Manufacturing Company, a corporation of Pennsylvania Application April 3, 1942, Serial No. 437,465

4 Claims. (Cl. 62—89)

My invention relates to refrigeration apparatus, and particularly to butter storage in a refrigerator.

In most modern refrigerators, especially those of the mechanical type, butter is stored in the main food storage compartment which is usually maintained at a temperature of about 40° F. While such a temperature preserves the butter over long periods of time, the butter is too hard to spread for some time after it is taken out of the refrigerator. On the other hand, if butter is stored in a warmer temperature for any appreciable time, it spoils and becomes rancid. It has, therefore, been suggested in the past to store butter in refrigerators in a container which holds only a small quantity of butter—for example, ½ pound—and to maintain the temperature of the container at from 55° F. to 65° F. by means of heaters. However, such containers are relatively expensive and require automatic control so that the butter does not become too warm and melt or spoil.

I have found that the ideal temperature for spreading for butters of most grades is between 55° F. and 60° F. Most grades of butter may be stored at these temperatures for several days without spoiling or becoming rancid. Obviously, such a container should contain only a small amount of butter for immediate table use and the main butter supply in the home would be stored in the colder compartments of the refrigerator.

It is an object of my invention, therefore, to provide a butter storage container for relatively small quantities of butter which will maintain the butter in a condition in which it may be readily spread when removed from the refrigerator, and furthermore, to accomplish this result without the use of heaters or automatic controls.

It is another object of my invention to provide a butter container which does not use valuable space in the main food storage compartments of a refrigerator.

It is a further object of my invention to provide a butter container in the most advantageous position in the refrigerator, and so proportion the heat leakage into the butter container that the butter will be maintained at an ideal temperature for storing for relatively short periods of time and for spreading when removed from the refrigerator.

It is still another object of my invention to locate a butter storage compartment in an extremely accessible position in a refrigerator.

Figure 1:
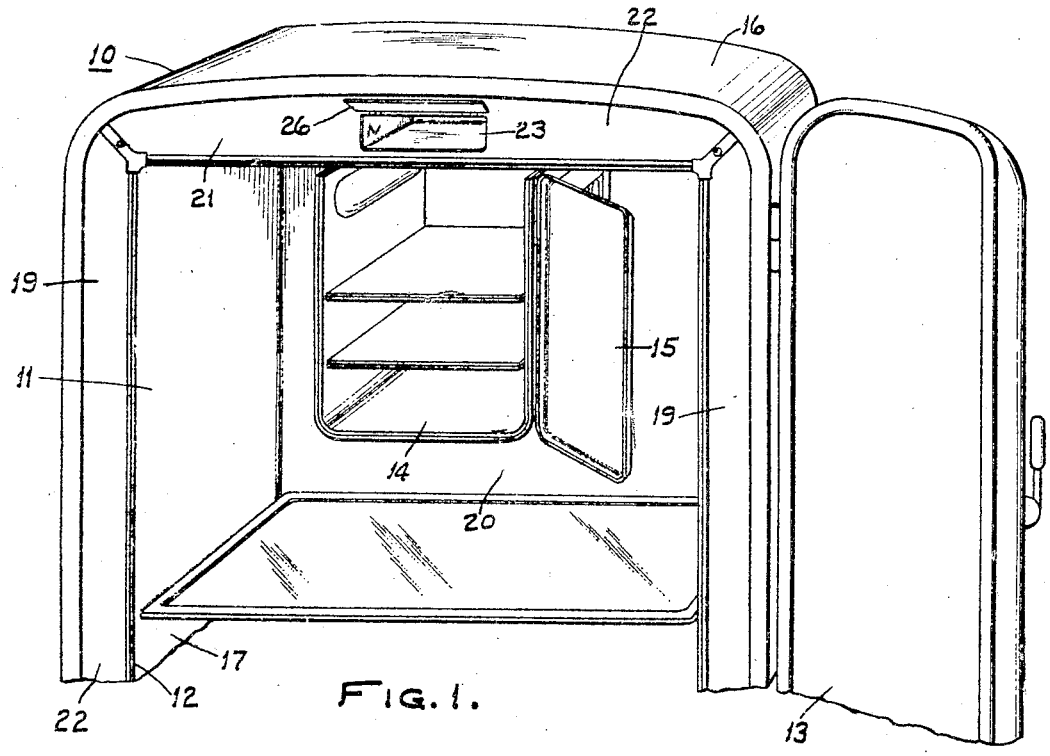
Figure 2:
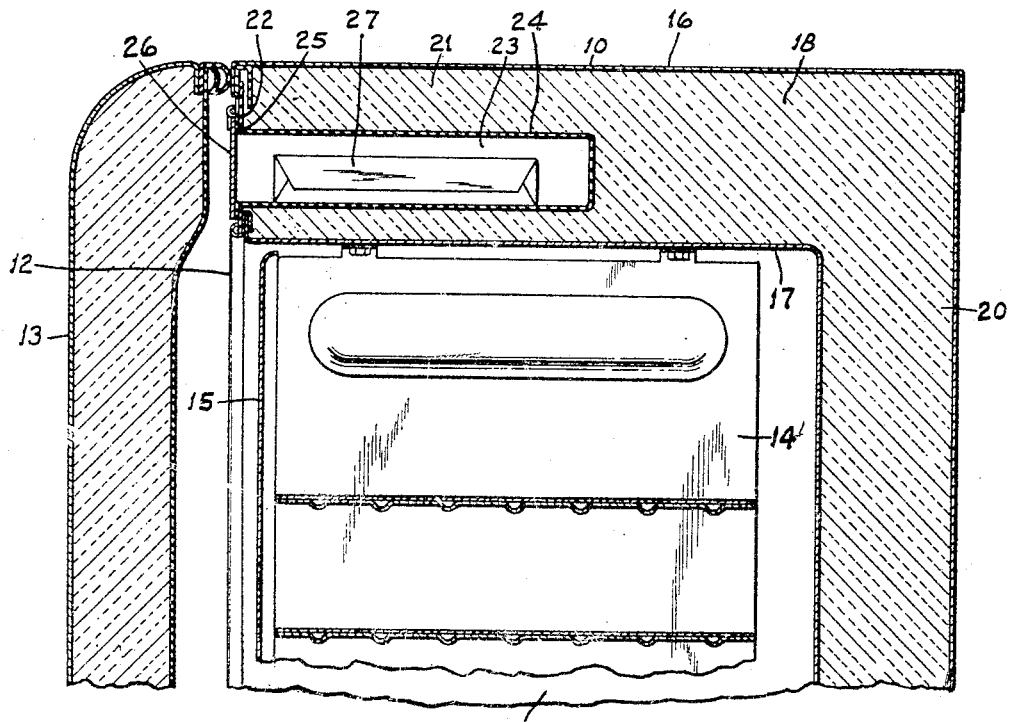

These and other objects are effected by my invention as will be apparent from the following description and claims taken in connection with the accompanying drawing, forming a part of this application, in which:

Fig. 1 is a partial perspective view of a refrigerator embodying my novel butter storage compartment; and Fig. 2 is a partial vertical sectional view of the upper portion of the refrigerator shown in Fig. 1.

Referring specifically to the drawing for a detailed description of my invention, numeral 10 designates generally a heat-insulated refrigerator cabinet having a food compartment 11, an access opening 12 in the front thereof, and a heat-insulated door 13 for closing the access opening. An evaporator or cooling element 14 is disposed in the upper part of the food compartment to cool the contents of the food compartment and to freeze ice. A decorative shield 15 is preferably placed at the front of the evaporator 14.

The refrigerator cabinet 11 is formed of an outer shell 16 and an inner shell 17 with heat insulation 18 therebetween, thus forming side walls 19, a back wall 20, a top wall 21, and a bottom wall (not shown). A breaker strip 22 extends between the shells 16 and 17 and is preferably substantially flat and lies at right angles to the side walls 19 of the refrigerator cabinet.

In accordance with my invention, a butter compartment 23 is disposed in the heat insulation 18 preferably in the top wall 21 of the cabinet, directly above the evaporator 14. The butter compartment is formed from an open-ended sleeve 24 to which access is obtained through an opening 25 in the breaker strip 22. A door 26 closes the open-ended sleeve 24. By positioning the butter compartment 23 directly above the evaporator 14 and properly proportioning the insulation between the sleeve 24 and the outer and inner shells 16 and 17, butter, shown at 27 in Fig. 2, will be maintained at approximately 58° F. with an outside temperature of 80° F. and an average food compartment temperature of 40° F. In normal operation, the food compartment temperature does not vary to any great degree, and normal changes in outside temperature do not affect the temperature in the butter compartment 23 by more than a few degrees because of its proximity to the cold evaporator 14 and because, as is apparent from the drawing, the insulation 18 between the sleeve 24 and the outer shell 16 is thicker than between the sleeve and the inner shell 17.

From the foregoing it will be apparent that I have provided an improved butter storage compartment for domestic refrigerators in which a fairly constant temperature is maintained without the use of heaters and complicated controls, so that small quantities of butter may be stored in a spreadable condition without quickly spoiling.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In refrigeration apparatus, the combination of a refrigerator cabinet comprising inner and outer shells, heat insulation between the shells, said shells defining the bottom, rear, side and top walls of a food-storage compartment, the portion of the outer shell defining said top wall being exposed to the ambient atmosphere surrounding the cabinet, an access opening at the front of the food-storage compartment, a door for closing the access opening, a cooling element adjacent the top of the food-storage compartment and a butter container disposed directly above said cooling element in the heat insulation in the top wall of said food-storage compartment.

2. In refrigeration apparatus, the combination of a refrigerator cabinet comprising inner and outer metallic shells, heat insulation between the shells, said shells defining the bottom, rear, side and top walls of a food-storage compartment, the portion of the metallic outer shell defining said top wall being exposed to the ambient atmosphere surrounding the cabinet, an access opening at the front of the food-storage compartment, a door for closing the access opening, a breaker strip extending between the inner and outer shells peripherally of the access opening, a cooling element for refrigerating the food-storage compartment, a butter container having an access opening in said breaker strip and disposed in the heat insulation in the top wall of the food-storage compartment and a closure for said butter compartment access opening.

3. In refrigeration apparatus, the combination of a refrigerator cabinet comprising inner and outer shells, heat insulation between the shells, said shells defining the bottom, rear, side and top walls of a food-storage compartment, said outer shell being exposed to the ambient atmosphere surrounding the cabinet, an access opening at the front of the food-storage compartment, a door for closing the access opening, a cooling element adjacent one of the walls of the food-storage compartment and a butter container disposed in said heat insulation adjacent said cooling element.

4. In refrigeration apparatus, the combination of a refrigerator cabinet comprising inner and outer metallic shells, heat insulation between the shells, said shells defining the bottom, rear, side and top walls of a food-storage compartment, said metallic outer shell being exposed to the ambient atmosphere surrounding the cabinet, an access opening in the front of the food-storage compartment, a door for closing the access opening, a breaker strip extending between the inner and outer shells peripherally of the access opening, a cooling element for refrigerating the food-storage compartment, and a butter container having an access opening in said breaker strip and being disposed in said heat insulation.

PAUL E. JAMES.